(12) United States Patent
Gao

(10) Patent No.: US 11,072,354 B2
(45) Date of Patent: Jul. 27, 2021

(54) ANTI-PINCH SYSTEM AND METHOD FOR PLATFORM SCREEN DOOR AND TRAIN

(71) Applicant: Traffic Control Technology Co., Ltd, Beijing (CN)

(72) Inventor: Chunhai Gao, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 486 days.

(21) Appl. No.: 15/965,847

(22) Filed: Apr. 28, 2018

(65) Prior Publication Data
US 2019/0291754 A1 Sep. 26, 2019

(30) Foreign Application Priority Data
Mar. 21, 2018 (CN) .......................... 201810235642.8

(51) Int. Cl.
*B61K 13/04* (2006.01)
*B61B 1/02* (2006.01)
(Continued)

(52) U.S. Cl.
CPC .............. *B61K 13/04* (2013.01); *B61B 1/02* (2013.01); *G01S 7/484* (2013.01); *G01S 17/42* (2013.01); *G01S 17/88* (2013.01); *G01S 17/93* (2013.01)

(58) Field of Classification Search
CPC .......... G01S 17/88; G01S 17/42; G01S 17/93; G01S 7/484; B01V 8/20; B61B 1/00; B61B 1/02; B61K 9/08; B61K 13/04; G01V 8/20
(Continued)

(56) References Cited

U.S. PATENT DOCUMENTS 4,551,944 A * 11/1985 Donaldson ................ B61B 1/02
49/262
7,328,662 B2 * 2/2008 Kasai ........................ B61B 1/02
105/429
(Continued)

FOREIGN PATENT DOCUMENTS

CN 201240379 Y 5/2009
CN 204269848 U 4/2015
(Continued)

OTHER PUBLICATIONS

The first Official Action and search report dated Nov. 15, 2019 for Chinese application No. 201810235642.8, 15 pages.
(Continued)

*Primary Examiner* — Zachary L Kuhfuss
(74) *Attorney, Agent, or Firm* — Law Offices of Liaoteng Wang

(57) ABSTRACT

An anti-pinch system and a method for a platform screen door and a train are disclosed. The system includes: a platform screen door (PSD) anti-pinch safety host, a three-dimensional laser radar and an alarm, wherein when both the platform screen door and a train door are in a closed state, the three-dimensional laser radar performs a three-dimensional scanning detection on an obstacle in an area between the platform screen door and the train in real time at an end of a platform by using an emitted laser scanning surface, and sends detection information of the obstacle to the PSD anti-pinch safety host; the detection information includes three-dimensional contour information of the obstacle; the PSD anti-pinch safety host is configured to process the detection information and send a processing result to the alarm; and the alarm is configured to send out an alarm according to the processing result.

18 Claims, 4 Drawing Sheets

(51) Int. Cl.
*G01S 7/484* (2006.01)
*G01S 17/42* (2006.01)
*G01S 17/93* (2020.01)
*G01S 17/88* (2006.01)

(58) Field of Classification Search
USPC .................................... 104/28, 30; 105/341
See application file for complete search history.

(56) References Cited

U.S. PATENT DOCUMENTS

| | | | | |
|---|---|---|---|---|
| 7,721,653 | B1* | 5/2010 | Burgess | B61B 1/02 |
| | | | | 104/28 |
| 9,373,149 | B2* | 6/2016 | Abhyanker | G06Q 50/28 |
| 9,777,528 | B2* | 10/2017 | Elie | E05F 15/46 |
| 10,618,529 | B2* | 4/2020 | Maruta | B60R 1/06 |
| 10,668,936 | B2* | 6/2020 | Gao | G01S 17/88 |
| 2005/0183338 | A1* | 8/2005 | Kasai | G01V 8/20 |
| | | | | 49/26 |
| 2015/0202770 | A1* | 7/2015 | Patron | G05D 1/024 |
| | | | | 700/245 |
| 2018/0118225 | A1* | 5/2018 | Marco | B61L 15/0027 |
| 2018/0136321 | A1* | 5/2018 | Verghese | G01S 7/4865 |
| 2018/0190120 | A1* | 7/2018 | Kim | B60W 30/0956 |
| 2019/0291754 | A1* | 9/2019 | Gao | G01S 17/88 |

FOREIGN PATENT DOCUMENTS

| | | |
|---|---|---|
| CN | 204496027 U | 7/2015 |
| CN | 205091477 U | 3/2016 |

OTHER PUBLICATIONS

Jian Cheng, et al., "Real-time vehicle detection using 3D lidar under complex urban environment", Journal of Zhejiang University (Engineering Science), vol. 48. No. 12, dated Dec. 31, 2014, 7 pages.

* cited by examiner

ANTI-PINCH SYSTEM AND METHOD FOR PLATFORM SCREEN DOOR AND TRAIN

CROSS-REFERENCE TO RELATED APPLICATION

This application is based upon and claims priority to Chinese Patent Application No. 201810235642.8, filed on Mar. 21, 2018, the content of which is incorporated herein by reference in its entirety.

TECHNICAL FIELD

The present disclosure relates to the technical field of emergency security, and particularly relates to an anti-pinch system for a platform screen door and a train.

BACKGROUND

At present, each station of most subway lines is equipped with platform screen doors, which may form a safe separation between a train and passengers so as to ensure the safety of the passengers to some extent. After the train stops at the station, the platform screen doors will be opened; and when the platform screen doors need to be closed and no foreign object is detected between the platform screen doors, the platform screen doors will be closed.

When the platform screen doors are to be closed, foreign objects will be detected in a gap between two platform screen doors. When there is a foreign object in the gap, the platform screen doors will remain open.

However, there is a blind area between a platform screen door and the train, that is, between a platform screen door and a train door as well as between a train body and a glass curtain wall of the platform screen door. That is, when a foreign object exists between the train door and the platform screen door, or when a foreign object exists between the train body and the glass curtain wall of the platform screen door (for example, suppose that a person passes the platform screen door before the platform screen door is closed, but has not entered the train door, and instead stays between the train body and the platform screen door or between the train body and the glass curtain wall for connecting platform screen doors. When the train door is closed before the person enters the train door, the person is in the blind area between the train body and the platform screen door), the platform screen door may be closed as usual because the foreign object between the platform screen door and the train cannot be detected.

Due to the existence of the blind area, when the train performs an outbound operation at a platform, and during a linkage process of the train door and the platform screen door, it is likely to pinch people or other foreign objects. This not only results in the failure of the linkage between the train door and the platform screen door, but also delays the operation time of the platform. Also, it may easily cause a threat to personal safety and loss of property. For example, an accident once occurred in the Beijing Subway Line 5 that a passenger was trapped between the train door and the platform screen door after the train door and the platform screen door are closed and the train leaves the platform, resulting in death of the passenger.

SUMMARY

According to an aspect of the present disclosure, an anti-pinch system for a platform screen door and a train is provided and the system includes: a platform screen door (PSD) anti-pinch safety host, a three-dimensional laser radar and an alarm, wherein: the three-dimensional laser radar is configured to, when both the platform screen door and a train door are in a closed state, perform a three-dimensional scanning detection on an obstacle in an area between the platform screen door and the train in real time at an end of a platform by using an emitted laser scanning surface, and send detection information of the obstacle to the PSD anti-pinch safety host; the detection information of the obstacle includes three-dimensional contour information of the obstacle; the PSD anti-pinch safety host is configured to receive the detection information of the obstacle sent by the three-dimensional laser radar, process the detection information of the obstacle and send a processing result to the alarm; and the alarm is configured to receive the processing result sent by the PSD anti-pinch safety host and send out an alarm according to the processing result.

In an embodiment, an installation position of the three-dimensional laser radar is a position determined according to a pulse intensity of a laser emitted by the three-dimensional laser radar, a length of the train, an angular resolution of the three-dimensional laser radar and a distance between the platform screen door and an outer wall of the train close to the platform screen door.

In an embodiment, the distance between the platform screen door and the outer wall of the train close to the platform screen door is equal to a distance between a first intersection line and a second intersection line; the first intersection line is an intersection line between the outer wall of the train close to the platform screen door and a first vertical laser scanning surface which is the only one vertical laser scanning surface among a plurality of vertical laser scanning surfaces perpendicular to a ground plane emitted by the three-dimensional laser radar that intersects with the outer wall of the train close to the platform screen door; and the second intersection line is an intersection line between the platform screen door and a second vertical laser scanning surface which is the only one vertical laser scanning surface among a plurality of vertical laser scanning surfaces perpendicular to the ground plane emitted by the three-dimensional laser radar that intersects with the platform screen door.

In an embodiment, the three-dimensional laser radar is specifically configured to emit a plurality of laser scanning surfaces perpendicular to a ground plane, and one of the plurality of laser scanning surfaces perpendicular to the ground plane is parallel to a track of the train.

In an embodiment, the three-dimensional contour information of the obstacle is information determined by performing scanning at angles with a preset interval along a direction perpendicular to the laser scanning surface by using the laser scanning surface emitted by the three-dimensional laser radar.

In an embodiment, the PSD anti-pinch safety host is specifically configured to classify the obstacle according to the detection information of the obstacle to obtain a classification result of the obstacle, and send the classification result to the alarm.

In an embodiment, the PSD anti-pinch safety host is specifically configured to classify the obstacle according to shape information and displacement information of the obstacle to determine the classification result of the obstacle; the shape information of the obstacle is information determined according to the three-dimensional contour information in the detection information of the obstacle; and the displacement information of the obstacle is information determined according to distance information between the obstacle and the three-dimensional laser radar in the detection information of the obstacle.

In an embodiment, the PSD anti-pinch safety host is specifically configured to determine that the classification result of the obstacle is a living creature if a change occurs in the shape information of the obstacle or the displacement information of the obstacle; and determine that the classification result of the obstacle is a non-living object if the shape information of the obstacle and the displacement information of the obstacle keep unchanged.

In an embodiment, the system further includes an interlocking module configured to send a signal indicating that both the platform screen door and the train door are closed to the PSD anti-pinch safety host; and the interlocking module is further configured to receive the processing result sent by the PSD anti-pinch safety host, so as to keep both the state of the platform screen door and the state of the train door in the closed state.

In an embodiment, the system further includes an automatic train supervision (ATS) module configured to receive the processing result sent by the PSD anti-pinch safety host.

In an embodiment, the PSD anti-pinch safety host is further configured to receive the signal sent by the interlocking module indicating that both the platform screen door and the train door are closed, and send the signal to the three-dimensional laser radar.

According to another aspect of the disclosure, an anti-pinch method for a platform screen door and a train is provided and the method includes: when both the platform screen door and a train door are in a closed state, a three-dimensional laser radar performing a three-dimensional scanning detection on an obstacle in an area between the platform screen door and the train in real time at an end of a platform by using an emitted laser scanning surface, and sending detection information of the obstacle to a PSD anti-pinch safety host; the PSD anti-pinch safety host receiving the detection information of the obstacle sent by the three-dimensional laser radar, processing the detection information of the obstacle and sending a processing result to an alarm; and the alarm receiving the processing result, and giving an alarm according to the processing result, wherein the detection information of the obstacle includes three-dimensional contour information of the obstacle.

In an embodiment, after both the platform screen door and the train door are closed and before the three-dimensional laser radar performs the detection on the obstacle in the area between the platform screen door and the train, the method includes determining an installation position of the three-dimensional laser radar according to a pulse intensity of a laser emitted by the three-dimensional laser radar, a length of the train, an angular resolution of the three-dimensional laser radar and a distance between the platform screen door and an outer wall of the train close to the platform screen door.

BRIEF DESCRIPTION OF THE DRAWINGS

To illustrate technical solutions in one or more embodiments of the present disclosure more clearly, a brief introduction on the drawings which are needed in the description of the embodiments of the present disclosure is given below. Other drawings may be obtained by those of ordinary skill in the art without any creative effort in accordance with these drawings.

DETAILED DESCRIPTION

Figure 1:
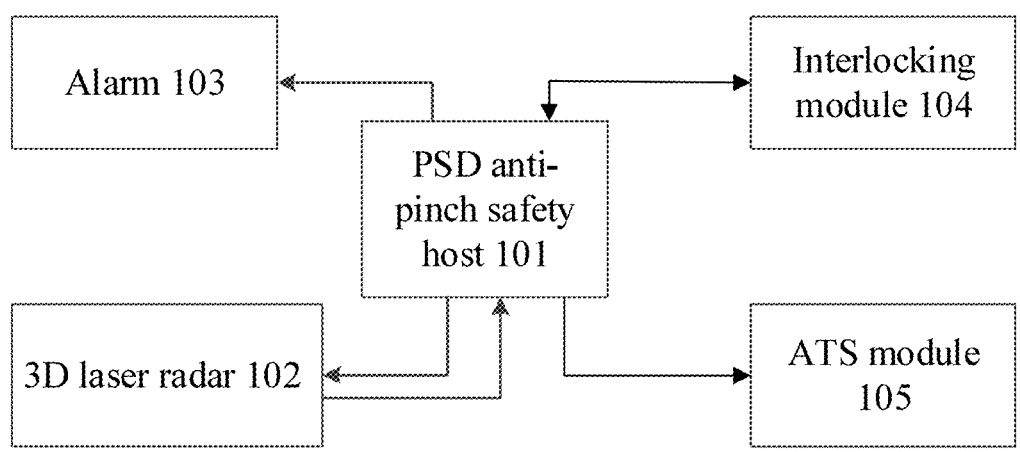
FIG. 1 shows a structural schematic diagram of an anti-pinch system for a platform screen door and a train according to an embodiment of the present disclosure.

The features and exemplary embodiments of various aspects of the present disclosure will be described in detail below. To make the objectives, technical solutions and advantages of the present application more apparent, the present application will be further described below in detail with reference to the drawings and embodiments. It should be understood that the specific embodiments described herein are only configured to explain the present application and are not configured to limit the present application. To those skilled in the art, the present application may be practiced without some of these specific details. The following description of the embodiments is merely intended to provide a better understanding of the present disclosure by illustrating examples of the present disclosure.

It should be noted that relational terms such as first, second and the like herein are only used to distinguish an entity or operation from another entity or operation, and do not require or imply these entities or operations have any such actual relationship or order. Moreover, the terms "comprise", "include" or any other variation thereof are intended to cover a non-exclusive inclusion, such that a process, a method, an article or a device that includes a series of elements includes not only those elements but also includes other elements that are not explicitly listed, or further includes elements inherent to such a process, method, article or device. In the case of no more limitation, the element defined by the phrase "include . . . " does not exclude that there are other same elements existing in the process, the method, the article or the device including the element.

In order to ensure the safety of passengers, platform screen doors are installed at an edge of a station platform to isolate a platform area from a track area. A platform screen door includes glass curtain walls and an electric door between the glass curtain walls. There are various types of platform screen doors, such as shield doors, safety doors or the like. The train doors and the platform screen doors may have three states: an open state, a closed state and a closed and locked state.

When the train doors and platform screen doors are all opened after the train stops, the train doors and the platform screen doors are in the open state to allow the passengers to get on or get off the train.

When the train doors and the platform screen doors receive a closing instruction, the train doors and the platform screen doors start a closing operation. When the train doors and the platform screen doors are closed but not locked, the train doors and the platform screen doors are in the closed state, and the train will not start at this time.

After the train doors and the platform screen doors are closed and locked, that is, when the train doors and the platform screen doors are in the closed and locked state, the train will start.

Because there are certain gaps between the platform screen doors and the train of the subway, during the process of closing the platform screen doors and the train doors, due to the rushing up and down of the passengers, when the train doors and the platform screen doors are in the closed state, safety accidents are likely to happen, for example, a person or other foreign object may be pinched.

In view of this, the embodiments of the present disclosure provide an anti-pinch system and method for a platform screen door and a train. Through the use of a laser scanning surface emitted by a three-dimensional laser radar, a three-dimensional scanning detection of an obstacle is performed in an area between the platform screen door and the train in real time at an end of the platform, thereby realizing the three-dimensional detection of the obstacle, effectively reducing or even eliminating the blind area between the train and the platform screen doors, and improving the safety of operations of the train.

FIG. 1 shows a schematic diagram of a system architecture of an anti-pinch system for a platform screen door and a train according to an embodiment of the present disclosure. As can be seen from FIG. 1, the anti-pinch system of the embodiment of the present disclosure mainly includes a platform screen door (PSD) anti-pinch safety host 101, a three-dimensional laser radar 102, and an alarm 103.

In the embodiment of the present disclosure, the three-dimensional laser radar 102 is configured to perform a three-dimensional scanning detection on an obstacle in an area between the platform screen door and the train in real time at an end of a platform by using an emitted laser scanning surface and send detection information of the obstacle to the PSD anti-pinch safety host 101, when both of the platform screen door and a train door are in a closed state. Here, the detection information of the obstacle includes three-dimensional contour information of the obstacle.

The PSD anti-pinch safety host 101 is configured to receive the detection information of the obstacle sent by the three-dimensional laser radar 102, process the detection information of the obstacle and send a processing result to the alarm 103.

The alarm 103 is configured to receive the processing result sent by the PSD anti-pinch safety host 101 and send out an alarm according to the processing result.

In the embodiment of the present disclosure, the three-dimensional laser radar 102 emits a laser beam to a target, then receives a signal reflected from the target, and compares the signal reflected from the target with the emitted signal, so as to obtain a distance between the three-dimensional laser radar 102 and the target, three-dimensional contour information of the target, a surface reflection feature of the target and other information.

In the embodiment of the present disclosure, the three-dimensional laser radar 102 may emit multiple laser pulse beams at different angles on a preset plane, thereby forming a sector-shaped laser area, i.e., laser scanning surfaces, in the preset plane. By controlling the laser scanning surfaces to perform a rotary scanning, a three-dimensional scanning detection of a target area may be realized to obtain the detection information of the obstacle in the target area. The detection information of the obstacle detected by the three-dimensional laser radar 102 may include three-dimensional contour information such as a length of the obstacle, a height of the obstacle away from the ground or the like, and information such as a distance between the obstacle and the three-dimensional laser radar 102, etc.

In the embodiment of the present disclosure, the three-dimensional laser radar 102 may be installed at any end of the platform. When both of the platform screen door and the train door are in the closed state, the three-dimensional laser radar 102 may emit the laser scanning surfaces to the area between the platform screen door and the train. By controlling a laser emitting device of the three-dimensional laser radar 102, the laser scanning surfaces emitted by the three-dimensional laser radar 102 scan at angles with a preset interval along a direction perpendicular to the laser scanning surfaces, so as to implement the three-dimensional scanning detection on the obstacle in the area between the platform screen door and the train.

Figure 2:
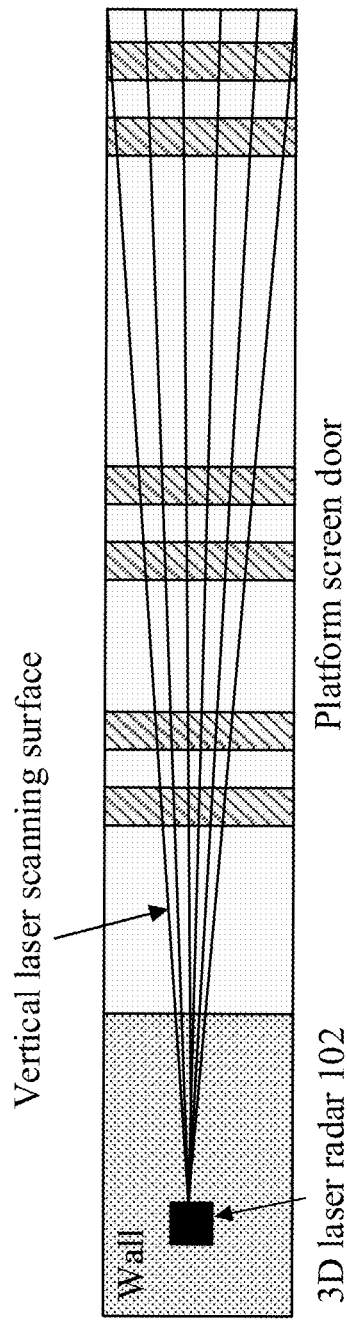
FIG. 2 shows a rear view of a three-dimensional laser radar and a train door according to another embodiment of the present disclosure.

In a specific example of the present disclosure, FIG. 2 is a rear view of the platform screen door and the three-dimensional laser radar 102. The three-dimensional laser radar 102 in FIG. 2 is installed on a wall at an end of the platform. The three-dimensional laser radar 102 may emit multiple laser pulse beams in a plane perpendicular to the ground plane and parallel to the platform screen door. The multiple laser pulse beams emitted by the three-dimensional laser radar form vertical laser scanning surfaces perpendicular to the ground.

Figure 3:
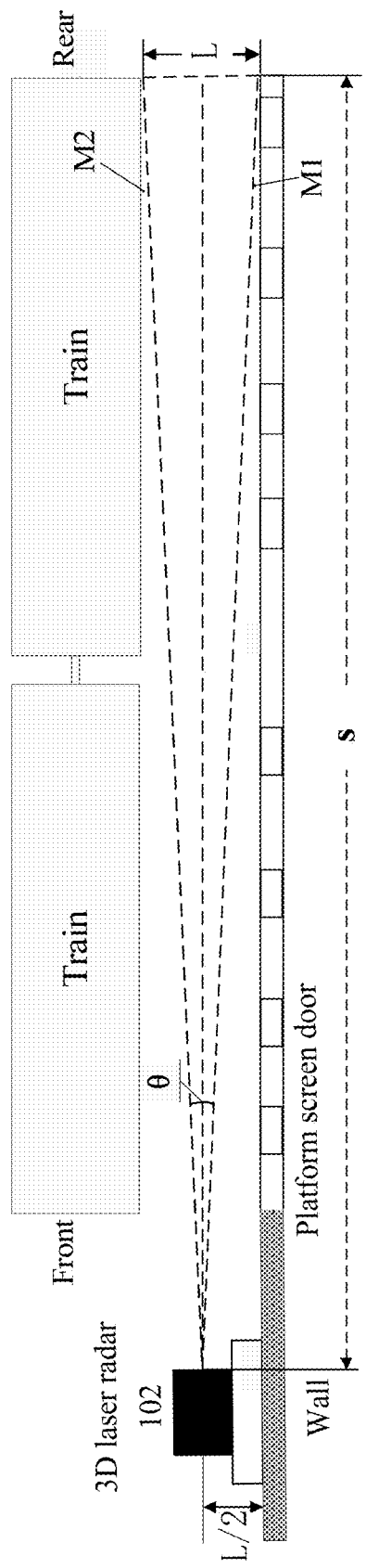
FIG. 3 shows a top view of the three-dimensional laser radar and the train door in FIG. 2 according to another embodiment of the present disclosure.

By rotating the laser emitting device of the three-dimensional laser radar 102, the rotary scanning in the plane parallel to the ground is achieved by the vertical laser scanning surfaces, that is, the three-dimensional laser radar 102 may emit different vertical laser scanning surfaces in multiple planes perpendicular to the ground. FIG. 3 is a top view of the three-dimensional laser radar 102 and the platform screen door in FIG. 2. The three-dimensional laser radar 102 emits the vertical laser scanning surface perpendicular to the ground. By rotating the laser emitting device of the three-dimensional laser radar 102, the vertical laser scanning surfaces can perform the rotary scanning at angles with the preset interval in the plane parallel to the ground. The rotating angle of the vertical laser scanning surfaces in the plane is denoted by θ. By rotating the vertical laser scanning surfaces emitted by the three-dimensional laser radar 102, the contour information such as the maximum height and the maximum width of the obstacle in the area between the train and the platform screen door may be obtained.

For the convenience of understanding, the installation position of the three-dimensional laser radar 102 is illustrated in combination with an actual application scenario. As shown in FIG. 3, a train stops in the platform, and the three-dimensional laser radar 102 may be located at any end of the platform, that is, the three-dimensional laser radar 102 may be placed at a preset distance in front of the front of the train or at a preset distance behind the rear of the train.

Since existing platforms are classified into elevated platforms and tunnel platforms. Preferably, in an application scenario of an elevated platform, the three-dimensional laser radar 102 may be hanged and installed in front of the front of the train or behind the rear of the train in the tunnel of a station area. In an application scenario of a tunnel platform, the three-dimensional laser radar 102 may be installed on a wall in front of the front of the train or behind the rear of the train in the tunnel of the station area and close to one side of the platform screen door. The installation manner of the three-dimensional laser radar 102 will not be limited specifically in the embodiments of the present disclosure, as long as the three-dimensional laser radar 102 can be fixed.

In a specific embodiment of the present disclosure, if the three-dimensional laser radar 102 is installed on the wall in front of the front of the train in the tunnel of the station area and close to one side of the platform screen door as shown in FIG. 3, the three-dimensional laser radar 102 emits the vertical laser scanning surfaces perpendicular to the ground forward (i.e., in the direction from the front to the rear of the train). By rotating the laser emitting device of the three-dimensional laser radar 102, the vertical laser scanning surfaces emitted by the three-dimensional laser radar 102 performs the rotary scanning at angles with a preset interval in a horizontal direction parallel to the ground, so as to implement the three-dimensional scanning detection on the obstacle in the area between the platform screen door and the train.

In some embodiments of the present disclosure, the three-dimensional laser radar 102 may also emit a horizontal laser scanning surface parallel to the ground plane, and control the horizontal laser scanning surface to perform rotary scanning in the vertical direction to implement the three-dimensional scanning detection on the obstacle. The laser scanning surface emitted by the three-dimensional laser radar 102 and the way to perform the rotary scanning by the laser scanning surface will not be limited specifically in the embodiments of the present disclosure.

The anti-pinch system of the present disclosure may utilize a single three-dimensional laser radar 102 to realize the three-dimensional scanning detection on the obstacle between the platform screen door and the train, thereby avoiding faults caused during communication and interaction of traditional double-end sensors. Also, since only one three-dimensional laser radar 102 is adopted, subsequent maintenance may be facilitated, and the cost may be reduced. In addition, the anti-pinch system of the present disclosure is not limited to the detection on a single line or a single plane in the area between the platform screen door and the train, thereby improving completeness and accuracy of the detection.

As an optional embodiment, in order to further improve the reliability of the anti-pinch system, at least one three-dimensional laser radars 102 may be employed in the anti-pinch system according to the embodiments of the present disclosure. As a specific example, two three-dimensional laser radars 102 may be respectively installed on the walls at both ends of the platform. The number of the three-dimensional laser radars 102 will not be limited specifically in the embodiments of the present disclosure, and may be set depending on the specific application scenario.

In the embodiments of the present disclosure, in order to accurately identify the obstacle in the area between the platform screen door and the train, it is necessary to ensure that an echo pulse returned from the obstacle in the area has a sufficient pulse intensity, so that the three-dimensional laser radar 102 can receive the echo pulse. Therefore, the installation position of the three-dimensional laser radar 102 may be related to the pulse intensity of the laser emitted by the three-dimensional laser radar 102.

In the embodiments of the present disclosure, it may be assumed that the three-dimensional laser radar 102 is installed at a preset distance in front of the front of the train. But because the length of each train may be different, the distance between the three-dimensional laser radar 102 and the rear of each train may be different. As the setting of the laser pulse intensity of the three-dimensional laser radar 102 is related to the distance between the three-dimensional laser radar 102 and the rear of the train, the installation position of the three-dimensional laser radar 102 may be related to the length of the train.

In the embodiments of the present disclosure, if the coverage of the three-dimensional laser radar 102 is too large, the laser pulses emitted by the three-dimensional laser radar 102 will fall onto the train or the platform screen door, then disturbance echoes formed by the refraction of the train or the platform screen door will return to the three-dimensional laser radar 102, thereby causing interference to the detection result of the area between the platform screen door and the train and giving a wrong alarm. If the coverage of the three-dimensional laser radar 102 is too small, an obstacle in a certain area between the platform screen door and the train may be not detected. As a specific example, as shown in FIG. 2, the three-dimensional laser radar 102 emits a plurality of vertical laser scanning surfaces perpendicular to the ground, and the area between two vertical laser scanning surfaces with the maximum included angle θ is the coverage of the laser pulses emitted by the three-dimensional laser radar.

In order to avoid that the refraction light waves of the laser pulses from the platform screen door and the train affect the detection result, a boundary of the laser pulses of the three-dimensional laser radar 102 need to be set. The boundary of the laser pulses of the three-dimensional laser radar 102 may be set according to the distance between the platform screen door and an outer wall of the train close to the platform screen door.

As a specific example, as shown in FIG. 3, in the case that the three-dimensional laser radar 102 emits the vertical laser scanning surfaces perpendicular to the ground, conditions for setting the boundary of the laser pulses may include that a laser beam emitted by the three-dimensional laser radar 102 cannot irradiate the platform screen door or the train, and when the vertical laser scanning surfaces emitted by the three-dimensional laser radar 102 are scanning between the rear of the train and a rear end of the platform screen door, the width that can be scanned in a horizontal plane is just equal to the distance between the platform screen door and the outer wall of the train close to the platform screen door.

That is, the distance between the platform screen door and the outer wall of the train close to the platform screen door is equal to the distance between a first intersection line and a second intersection line. The first intersection line is an intersection line between the outer wall of the train close to the platform screen door and a first vertical laser scanning surface which is the only one vertical laser scanning surface among a plurality of vertical laser scanning surfaces perpendicular to the ground plane emitted by the three-dimensional laser radar 102 that intersects with the outer wall of the train close to the platform screen door. The second intersection line is an intersection line between the platform screen door and a second vertical laser scanning surface which is the only one vertical laser scanning surface among a plurality of vertical laser scanning surfaces perpendicular to the ground plane emitted by the three-dimensional laser radar 102 that intersects with the platform screen door.

As shown in FIG. 3, only one vertical laser scanning surface (i.e. the dashed line represented by M1 in FIG. 3) among the plurality of vertical laser scanning surfaces emitted by the three-dimensional laser radar 102 intersects with the platform screen door. Only one vertical laser scanning surface (i.e. the dashed line represented by M2 in FIG. 3) among the plurality of vertical laser scanning surfaces emitted by the three-dimensional laser radar 102 intersects with the train.

To satisfy that only one vertical laser scanning surface intersects with the platform screen door and only one vertical laser scanning surface intersects with the train, the vertical laser scanning surface (i.e., M1) at one edge emitted by the three-dimensional laser radar 102 interacts with the rear end of the platform screen door, and the vertical laser scanning surface (i.e., M2) at the other edge emitted by the three-dimensional laser radar 102 interacts with the rear of the train. As shown in FIG. 3, at the rear of the train, the distance between the first intersection line (between the vertical laser scanning surface M1 and the platform screen door) and the second intersection line (between the vertical laser scanning surface M2 and the train) is equal to the width L between the platform screen door and the outer wall of the train close to the platform screen door.

To perform the boundary setting of the three-dimensional laser radar 102, a shielding sheet may be used to shield the laser emitting device of the three-dimensional laser radar 102. However, as shown in FIG. 3, assuming that the conditions for setting the boundary of the laser pulses are satisfied and the shielding sheet does not change, if the three-dimensional laser radar 102 moves a certain distance toward the rear of the train, that is, the distance between the three-dimensional laser radar 102 and the rear of the train is reduced, then all the vertical laser scanning surfaces emitted by the three-dimensional laser radar 102 will not intersect with the train or the platform screen door. So the position of the three-dimensional laser radar 102 is related to the boundary setting of the laser pulses.

In some embodiments of the present disclosure, in a scenario where the three-dimensional laser emission radar emits a horizontal laser scanning surface parallel to the ground plane, the conditions for the boundary setting may include two points: (1) the laser beams emitted by the three-dimensional laser radar 102 do not irradiate the platform screen door or the train; and (2) the horizontal laser scanning surface has two edge laser lines, namely, a first edge laser line and a second edge laser line, in which there is only one intersection point (referred to as a first intersection point) between the first edge laser line and the platform screen door, there is only one intersection point (referred to as a second intersection point) between the second edge laser line and the train, and the distance between the first and second intersection points is equal to the width between the platform screen door and the outer wall of the train close to the platform screen door.

In the embodiments of the present disclosure, the plane where the laser scanning surface emitted by the three-dimensional laser radar 102 is located will not be limited to be perpendicular to the ground plane or parallel to the ground plane, and may be determined depending on the specific application scenario. For different application scenarios, the conditions for setting the boundary of the laser pulses may be determined according to the distance between the platform screen door and the outer wall of the train close to the platform screen door depending on the specific application scenario.

In the embodiments of the present disclosure, in order to ensure the reliability and the accuracy of detecting the obstacle between the platform screen door and the train, an angular resolution of the three-dimensional laser radar 102 needs to satisfy a certain condition. Specifically, as shown in FIG. 3, a predetermined condition to be satisfied by the angular resolution is that a resolution of horizontal distances of two adjacent vertical laser scanning surfaces emitted by the three-dimensional laser radar 102 from the obstacle at the rear of the train is less than or equal to 50 cm. Therefore, the choice of the angular resolution of the three-dimensional laser radar 102 is related to the distance between the three-dimensional laser radar 102 and the rear of the train, i.e., related to the installation position of the three-dimensional laser radar 102. The predetermined condition to be satisfied by the angular resolution is not specifically limited in the embodiments of the present disclosure, as long as the obstacle between the train and the platform screen door can be detected.

Therefore, in the embodiments of the present disclosure, the installation position of the three-dimensional laser radar 102 is a position determined according to the pulse intensity of the laser emitted by the three-dimensional laser radar 102, the length of the train, the angular resolution of the three-dimensional laser radar 102 and the distance between the platform screen door and the outer wall of the train close to the platform screen door.

In a specific embodiment of the present disclosure, FIGS. 2 and 3 respectively show a rear view and a top view of the three-dimensional laser radar 102. As shown in FIG. 2, preferably, the height of the three-dimensional laser radar 102 from the ground is a half of the height of the platform screen door. As shown in FIG. 3, the distance from the laser emission center of the three-dimensional laser radar 102 to the platform screen door is equal to a half of the distance between the platform screen door and the outer wall of the train close to the platform screen door. As shown in FIG. 3, the three-dimensional laser radar 102 is installed at an end of the platform, i.e., installed on the wall at one side of the platform screen door and in front of the front of the train. The distance s between the three-dimensional laser radar 102 and the rear of the train in the track direction needs to be determined according to the pulse intensity of the laser emitted by the three-dimensional laser radar 102, the length of the train, the angular resolution of the three-dimensional laser radar 102 and the distance between the platform screen door and the outer wall of the train close to the platform screen door.

A first range of the distance s may be obtained by using the pulse intensity of the laser emitted by the three-dimensional laser radar 102 and the length of the train. According to the angular resolution of the three-dimensional laser radar 102 and the predetermined condition to be satisfied by the angular resolution, a second range of s may be determined. A third range of s may be determined by using the distance between the platform screen door and the outer wall of the train close to the platform screen door and the above conditions for setting the boundary of the laser pulses. Combining the first range of s, the second range of s and the third range of s, the final value of s may be determined, that is, the final installation position of the three-dimensional laser radar 102 may be determined.

In the embodiments of the present disclosure, in order to make sure that the three-dimensional laser radar 102 may perform the detection of the maximum coverage in the area between the platform and the train door, preferably, in the direction parallel to the track, the three-dimensional laser radar 102 is 10 meters (m) to 20 meters from the front of the train, or the three-dimensional laser radar 102 is installed 10 meters to 20 meters behind the rear of the train.

In the embodiments of the present disclosure, the boundary setting of the three-dimensional laser pulse needs to be considered when determining the final installation position of the three-dimensional laser radar 102, and the boundary setting of the three-dimensional laser pulse is related to the scanning direction and the scanning range of the laser scanning surface emitted by the three-dimensional laser radar 102. Therefore, when the installation position of the three-dimensional laser radar 102 is determined, the installation angle of the three-dimensional laser radar 102 is also determined accordingly.

In some embodiments of the present disclosure, in order to solve the problem concerning the shielding of multiple obstacles between the platform screen door and the train and further improve the accuracy of the three-dimensional scanning detection on the obstacles, a position that is higher than the top of the train or the top of the platform screen door by a preset distance may be preferably selected as the installation position of the three-dimensional laser radar 102.

Preferably, in the current elevated platform scenario, the platform screen door is generally designed as a half-height safety door, and the installation height of the three-dimensional laser radar 102 is selected to be 0.5 m-1 m higher than the top of the train. In the tunnel platform scenario, the installation height of the three-dimensional laser radar 102 is 0.5 m-1 m higher than the top of the screen door.

In combination with the specific application scenario of the platform, the range of s may be determined first, and then the height of the three-dimensional laser radar 102 from the ground and the horizontal distance between the three-dimensional laser radar 102 and the platform are adjusted, so that when the three-dimensional laser radar 102 is located at the finally determined installation position, the three-dimensional laser radar 102 can receive echo pulses of sufficient intensity, the angular resolution satisfies a preset condition, and the laser pulses emitted by the three-dimensional laser radar 102 satisfy the boundary conditions. The specific adjusting sequence and adjusting method of the height of the three-dimensional laser radar 102 from the ground, the s and the horizontal distance between the three-dimensional laser radar 102 and the platform are not specifically limited in the embodiments of the present disclosure.

In the embodiments of the present disclosure, when the horizontal distance between the laser emission center of the three-dimensional laser radar 102 and the platform screen door is less than or equal to the distance between the platform screen door and the outer wall of the train close to the platform screen door, one of the plurality of laser scanning surfaces perpendicular to the ground plane emitted by the three-dimensional laser radar 102 is parallel to the track of the train. With such an installation position, the detection blind area of the three-dimensional laser radar 102 may be reduced, so that the area between the train and the platform screen door may be detected more accurately. Preferably, as shown in FIG. 3, the horizontal distance between the laser emission center of the three-dimensional laser radar 102 and the platform screen door is a half of the distance L between the train and the platform screen door.

In the embodiments of the present disclosure, the three-dimensional laser radar 102 is connected with the PSD anti-pinch safety host 101 through an optical fiber cable and send the detection information of the obstacle to the PSD anti-pinch safety host 101, so that the PSD anti-pinch safety host 101 can process the detection information of the obstacle.

In the embodiments of the present disclosure, when an obstacle exists in the area between the train and the platform screen door, the three-dimensional laser radar 102 receives the echo pulse information of the obstacle, and the data processing software corresponding to the three-dimensional laser radar 102 processes the echo pulse information detected in real time to obtain the three-dimensional contour information of the obstacle and the distance between the three-dimensional laser radar 102 and the obstacle. The data processing software corresponding to the three-dimensional laser radar 102 is installed in the PSD anti-pinch safety host 101. The PSD anti-pinch safety host 101 directly reads the detection information of the obstacle in the software, and then sends the detection information to the alarm 103. The alarm 103 sends out an alarm based on the detection information of the obstacle. The alarm 103 and the PSD anti-pinch safety host 101 are connected by a hard wire.

In some embodiments of the present disclosure, the PSD anti-pinch safety host 101 may also be specifically configured to classify obstacles according to the detection information of the obstacles to obtain a classification result of the obstacles, and sending the classification result to the alarm 103.

The PSD anti-pinch safety host 101 may be specifically configured to classify the obstacles according to shape information and displacement information of the obstacles to determine the classification result of the obstacles. The shape information of an obstacle is information determined according to the three-dimensional contour information in the detection information of the obstacle; and the displacement information of the obstacle is information determined according to the distance information between the obstacle and the three-dimensional laser radar 102 in the detection information of the obstacle.

Specifically, when the PSD anti-pinch safety host 101 detects an obstacle between the platform screen door and the train, the PSD anti-pinch safety host 101 performs picture sampling on the data in the data processing software corresponding to the three-dimensional laser radar 102 according to a preset sampling time interval.

In the embodiments of the present disclosure, the PSD anti-pinch safety host 101 may be specifically configured to determine that the classification result of the obstacle is a living creature if a change occurs in the shape information of the obstacle and/or the displacement information of the obstacle; and determine that the classification result of the obstacle is a non-living object if the shape information of the obstacle and the displacement information of the obstacle keep unchanged.

Specifically, if the rate of change between the sampling result of the current obstacle displacement and the sampling result of a first obstacle displacement is greater than a preset threshold, or if the rate of change between the sampling result of the current obstacle shape and the sampling result of a first obstacle shape is greater than or equal to a preset threshold, the obstacle is determined to be a living creature; or otherwise, the obstacle is determined to be a non-living object.

Preferably, the ranges of the rates of change of the displacement and the shape of the obstacle are 2%-5%. The preset sampling time interval of the PSD anti-pinch safety host 101 is not specifically limited in the embodiments of the present disclosure.

In the embodiments of the present disclosure, after the classification result of the obstacle is confirmed, the PSD anti-pinch safety host 101 outputs the classification result to the alarm 103, so that the alarm 103 can send out an alarm and an emergency process can be manually performed to ensure that the train in the platform will not start.

In the embodiments of the present disclosure, when the PSD anti-pinch safety host 101 determines that the obstacle between the train and the platform screen is a living creature, a station worker may open the platform screen door and bring the person or animal to a platform waiting area.

When the PSD anti-pinch safety host 101 determines that the obstacle between the train and the platform screen is a non-living object, it may be determined by the station worker or the driver to make a confirmation with the passengers depending on a specific situation of an owner of the obstacle. When the owner of the obstacle is in the train, the station worker may open the train door and take the obstacle into the train. When obstacle cannot be taken into the train, the station worker may open the platform screen door and bring both the owner of the obstacle and the obstacle to the platform waiting area. When the owner of the obstacle is in the platform waiting area, the station worker may open the platform screen door and take the obstacle back to the platform waiting area.

In the embodiments of the present disclosure, the alarm 103 may include an audible and visual alarm, and may also be other types of alarms, as long as the alarm function can be achieved, which is not specifically limited in the embodiments of the present disclosure.

In some embodiments of the present disclosure, as shown in FIG. 1, the anti-pinch system for the platform screen door and the train further includes an interlocking module 104 configured to send a signal indicating that both of the platform screen door and the train door are closed to the PSD anti-pinch safety host 101.

The interlocking module 104 may be further configured to receive the processing result sent by the PSD anti-pinch safety host 101, so as to keep both the state of the platform screen door and the state of the train door in the closed state.

In a signal system, the interlocking module 104 may receive the classification result sent by the PSD anti-pinch safety host 101 and then keep the states of the platform screen door and the train door in the "closed" state instead of changing their states to "closed and locked", so that the staff may perform the emergency process.

In the embodiments of the present disclosure, the interlocking module 104 may be connected with the PSD anti-pinch safety host 101 through an automatic train control (ATC) network so as to send the signal indicating that both of the platform screen door and the train door are closed to the PSD anti-pinch safety host 101. The PSD anti-pinch safety host 101 may receive the signal from the interlocking module 104 indicating that both of the platform screen door and the train door are closed through the Ethernet, and send the "closed" signal to the three-dimensional laser radar 102, so that the three-dimensional laser radar 102 can start to emit the laser scanning surface to perform the three-dimensional scanning detection on obstacles.

In the embodiments of the present disclosure, if the three-dimensional laser radar 102 does not detect an obstacle in the area between the train door and the platform screen door, the states of the train door and the platform screen door will be changed to "closed and locked". The interlocking module 104 may send a signal indicating that the train door and the platform screen door are closed and locked to the three-dimensional laser radar 102 through the PSD anti-pinch safety host 101. The three-dimensional laser radar 102 stops working when receiving the signal indicating that the train door and the platform screen door are closed and locked, and restarts when the signal indicating that both the train door and the platform screen door are closed is received again.

In some embodiments of the present disclosure, as shown in FIG. 1, the anti-pinch system for the platform screen door and the train further includes an automatic train supervision (ATS) module 105 configured to receive the processing result sent by the PSD anti-pinch safety host 101, so that an ATS dispatcher will manually perform the emergency process after receiving the alarm information from the anti-pinch system for the subway platform door and make sure that the train in the platform will not start.

In some embodiments of the present disclosure, as shown in FIG. 1, the anti-pinch system for the platform screen door and the train includes the interlocking module 104 and the ATS module 105 to ensure the PSD anti-pinch safety host 101 sends the alarm information to the interlocking module 104 while sending the alarm information to the ATS dispatch center, in order to improve the operation safety of the train from multiple aspects.

A principle verification test of the anti-pinch system between the platform screen door and the train proposed by the present disclosure is carried out in connection with an embodiment simulated in a laboratory.

This verification test uses a platform area simulated in the laboratory as a closed space application scenario. In the verification test, the laboratory is used to simulate the train stopped in the platform, and a wall outside the laboratory is used to simulate the platform screen door. A laser radar is installed on the wall outside the laboratory, and the height of the laser radar from the ground is 1 m.

In this verification test, passengers are simulated by laboratory personnel, and the detection area between the train and the platform screen door is simulated by the detection area between the wall outside the laboratory and an outer wall of the laboratory close to the wall. During the verification test, the laboratory personnel stand in the detection area, and the scanning detection is performed in the detection area by using the laser radar.

Figure 4:
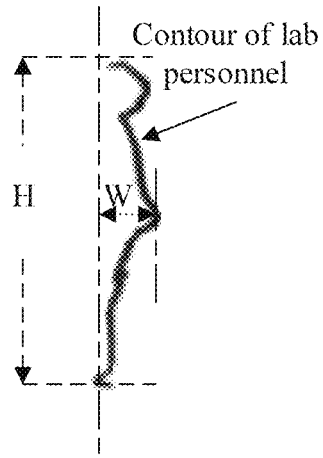
FIG. 4 shows a verification test result of a platform area closed space according to yet another embodiment of the present disclosure.

FIG. 4 shows the result of scanning detection in the detection area between the wall outside the laboratory and the outer wall of the laboratory close to the wall by using the laser radar. As can be seen in FIG. 4, the laser radar may scan out a contour of the laboratory personnel standing in the detection area. The solid line in FIG. 4 is the contour of the laboratory personnel. The laser radar processes the contour of the laboratory personnel by using a corresponding data processing software. It may be concluded that the height H of the laboratory personnel from the ground is 1.73 m, and the corresponding width W of the laboratory personnel at different heights may be obtained. The distance between the laboratory personnel and the laser radar may be calculated based on the echo pulse information generated by the laboratory personnel on the laser emitted by the laser radar. In this verification test, the distance between the laboratory personnel and the laser radar is 6.54 m.

In this verification test, in the detection area between the wall outside the laboratory and the outer wall of the laboratory close to the wall, the obstacles being living creatures are simulated by enter and exit of the laboratory personnel in the detection area, and the obstacles being non-living objects are simulated by placement of articles in the detection area.

The above verification test mainly tests the closed scenario in the indoor platform area. It can be seen according to the result of the experimental principle test that the anti-pinch system provided by the embodiments of the present disclosure can effectively detect the obstacle in the area between the platform screen door and the train and accurately determine the type of the obstacle. Accordingly, the anti-pinch system provided by the embodiments of the present disclosure can also be applied to a platform area located in an outdoor open space.

The anti-pinch system provided in the embodiments of the present disclosure may implement the three-dimensional scanning detection on the obstacle in the blind area between the train and the platform screen door. When the system detects the obstacle between the train and the platform screen door, the staff may perform a secondary confirmation on the obstacle more visually and efficiently, thereby increasing the timeliness and accuracy of manual confirmation and improving the safe reliability of the system.

Figure 5:
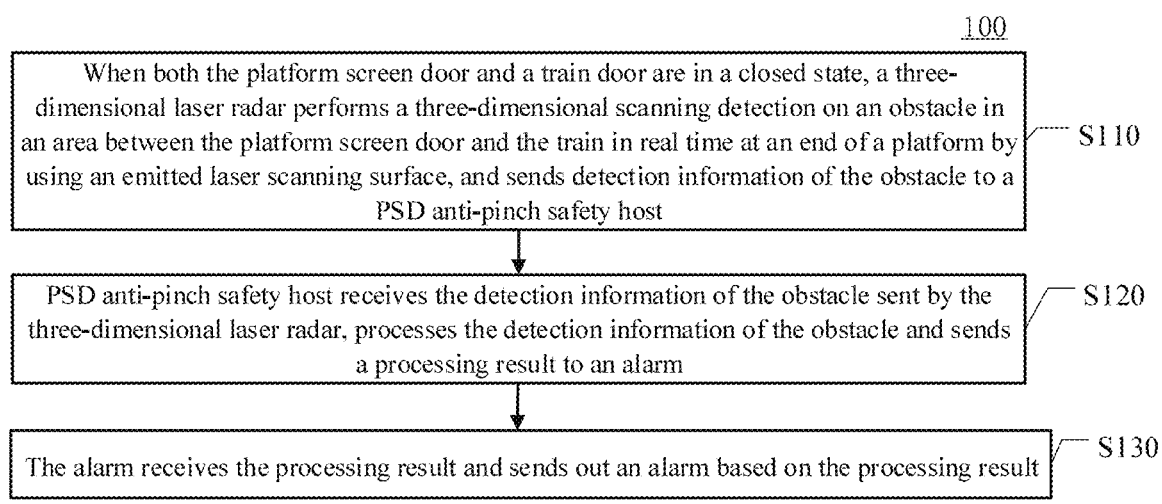
FIG. 5 shows a schematic flow diagram of an anti-pinch method for a platform screen door and a train according to yet another embodiment of the present disclosure.

FIG. 5 shows a schematic flow diagram of an anti-pinch method for a platform screen door and a train provided by an embodiment of the present disclosure. The method includes steps S110 to S130.

At S110, when both the platform screen door and a train door are in a closed state, a three-dimensional laser radar performs a three-dimensional scanning detection on an obstacle in an area between the platform screen door and the train in real time at an end of the platform by using an emitted laser scanning surface, and sends detection information of the obstacle to a PSD anti-pinch safety host.

At S120, the PSD anti-pinch safety host receives the detection information of the obstacle sent by the three-dimensional laser radar, processes the detection information of the obstacle and sends a processing result to an alarm.

At S130, the alarm receives the processing result, and sends out an alarm according to the processing result.

Here, the detection information of the obstacle includes three-dimensional contour information of the obstacle.

In the embodiments of the present disclosure, before the step S110, the anti-pinch method for the platform screen door and the train further includes step S100.

At S100, an installation position of the three-dimensional laser radar may be determined according to a pulse intensity of a laser emitted by the three-dimensional laser radar, a length of the train, an angular resolution of the three-dimensional laser radar and a distance between the platform screen door and an outer wall of the train close to the platform screen door.

In the embodiments of the present disclosure, the three-dimensional contour information of the obstacle is information determined by performing scanning at angles with a preset interval along a direction perpendicular to the laser scanning surface by using the laser scanning surface emitted by the three-dimensional laser radar.

In the embodiments of the present disclosure, the distance between the platform screen door and the outer wall of the train close to the platform screen door is equal to a distance between a first intersection line and a second intersection line; the first intersection line is an intersection line between the outer wall of the train close to the platform screen door and a first vertical laser scanning surface which is the only one vertical laser scanning surface among a plurality of vertical laser scanning surfaces perpendicular to a ground plane emitted by the three-dimensional laser radar that intersects with the outer wall of the train close to the platform screen door; and the second intersection line is an intersection line between the platform screen door and a second vertical laser scanning surface which is the only one vertical laser scanning surface among a plurality of vertical laser scanning surfaces perpendicular to the ground plane emitted by the three-dimensional laser radar that intersects with the platform screen door.

In the embodiments of the present disclosure, the step S110 may further include emitting, by the three-dimensional laser radar, a plurality of laser scanning surfaces perpendicular to a ground plane, wherein one of the plurality of laser scanning surfaces perpendicular to the ground plane is parallel to a track of the train.

In the embodiment of the present disclosure, the step S120 may specifically include the PSD anti-pinch safety host classifying the obstacle according to the detection information of the obstacle to obtain a classification result of the obstacle, and sending the classification result to the alarm.

Here, the PSD anti-pinch safety host classifies the obstacle according to shape information and displacement information of the obstacle to determine the classification result of the obstacle. The PSD anti-pinch safety host determines that the classification result of the obstacle is a non-living object if the shape information of the obstacle and the displacement information of the obstacle keep unchanged.

The shape information of the obstacle is information determined according to the three-dimensional contour information in the detection information of the obstacle; and the displacement information of the obstacle is information determined according to the distance between the obstacle and the three-dimensional laser radar in the detection information of the obstacle.

In the embodiments of the present disclosure, between the step S100 and the step S110, the method may further include sending, by an interlocking module, a signal indicating that both the platform screen door and the train door are closed to the PSD anti-pinch safety host; and the PSD anti-pinch safety host receiving the signal sent by the interlocking module indicating that both the platform screen door and the train door are closed and sending the signal to the three-dimensional laser radar.

In some embodiments of the present disclosure, the anti-pinch method for the platform screen door and the train may further include step S140.

At S140, the interlocking module receives the processing result sent by the PSD anti-pinch safety host, so as to keep both the state of the platform screen door and the state of the train door in the closed state.

In some embodiments of the present disclosure, the anti-pinch method for the platform screen door and the train may further include step S150.

At S150, an automatic train supervision (ATS) module receives the processing result sent by the PSD anti-pinch safety host.

According to the anti-pinch method provided by the embodiments of the present disclosure, the three-dimensional laser radar installed at an end of the platform can emit the laser scanning surface to perform the rotary scanning in the area between the platform screen door and the train, thereby realizing the three-dimensional detection on the obstacle in the area and improving the operation safety of the train.

Other details of the anti-pinch method for the platform screen door and the train according to the embodiments of the present disclosure are similar to those of the anti-pinch system of the platform screen door and the train according to the embodiments of the present disclosure described above with reference to FIGS. 1 to 4, and will not be described repeatedly herein.

The embodiments of the present disclosure may be embodied in other specific forms without departing from its spirit or essential characteristics. It should be understood by those of ordinary skill in the art that the present embodiments should be considered in all respects to be illustrative rather than restrictive, and that the scope of the present disclosure is defined by the appended claims rather than the foregoing description, and all changes that come within the meaning of the claims and their equivalents are therefore included within the scope of the present disclosure.

What is claimed is:

1. An anti-pinch system for a platform screen door and a train, comprising: a platform screen door (PSD) anti-pinch safety host, a three-dimensional laser radar and an alarm, wherein:
the three-dimensional laser radar is configured to, when both the platform screen door and a train door are in a closed state, perform a three-dimensional scanning detection on an obstacle in an area between the platform screen door and the train in real time at an end of a platform by using an emitted laser scanning surface, and send detection information of the obstacle to the PSD anti-pinch safety host;
the detection information of the obstacle comprises three-dimensional contour information of the obstacle;
the PSD anti-pinch safety host is configured to receive the detection information of the obstacle sent by the three-dimensional laser radar, process the detection information of the obstacle and send a processing result to the alarm; and
the alarm is configured to receive the processing result sent by the PSD anti-pinch safety host and send out an alarm according to the processing result,
wherein the three-dimensional laser radar is installed at the end of the platform, and an installation position of the three-dimensional laser radar is a position determined according to a pulse intensity of a laser emitted by the three-dimensional laser radar, a length of the train, an angular resolution of the three-dimensional laser radar and a distance between the platform screen door and an outer wall of the train close to the platform screen door.

2. The system according to claim 1, wherein the distance between the platform screen door and the outer wall of the train close to the platform screen door is equal to a distance between a first intersection line and a second intersection line;
the first intersection line is an intersection line between the outer wall of the train close to the platform screen door and a first vertical laser scanning surface which is the only one vertical laser scanning surface among a plurality of vertical laser scanning surfaces perpendicular to a ground plane emitted by the three-dimensional laser radar that intersects with the outer wall of the train close to the platform screen door; and
the second intersection line is an intersection line between the platform screen door and a second vertical laser scanning surface which is the only one vertical laser scanning surface among a plurality of vertical laser scanning surfaces perpendicular to the ground plane emitted by the three-dimensional laser radar that intersects with the platform screen door.

3. The system according to claim 1, wherein the three-dimensional laser radar is specifically configured to emit a plurality of laser scanning surfaces perpendicular to a ground plane, and one of the plurality of laser scanning surfaces perpendicular to the ground plane is parallel to a track of the train.

4. The system according to claim 1, wherein the three-dimensional contour information of the obstacle is information determined by performing scanning at angles with a preset interval along a direction perpendicular to the laser scanning surface by using the laser scanning surface emitted by the three-dimensional laser radar.

5. The system according to claim 1, wherein the PSD anti-pinch safety host is specifically configured to classify the obstacle according to the detection information of the obstacle to obtain a classification result of the obstacle, and send the classification result to the alarm.

6. The system according to claim 5, wherein the PSD anti-pinch safety host is specifically configured to classify the obstacle according to shape information and displacement information of the obstacle to determine the classification result of the obstacle;
the shape information of the obstacle is information determined according to the three-dimensional contour information in the detection information of the obstacle; and
the displacement information of the obstacle is information determined according to distance information between the obstacle and the three-dimensional laser radar in the detection information of the obstacle.

7. The system according to claim 6, wherein the PSD anti-pinch safety host is specifically configured to:
determine that the classification result of the obstacle is a living creature if a change occurs in the shape information of the obstacle or the displacement information of the obstacle; and
determine that the classification result of the obstacle is a non-living object if the shape information of the obstacle and the displacement information of the obstacle keep unchanged.

8. The system according to claim 1, further comprising:
an interlocking module configured to send a signal indicating that both the platform screen door and the train door are closed to the PSD anti-pinch safety host; and
the interlocking module is further configured to receive the processing result sent by the PSD anti-pinch safety host, so as to keep both the state of the platform screen door and the state of the train door in the closed state.

9. The system according to claim 1, further comprising:
an automatic train supervision (ATS) module configured to receive the processing result sent by the PSD anti-pinch safety host.

10. The system according to claim 8, further comprising:
an automatic train supervision (ATS) module configured to receive the processing result sent by the PSD anti-pinch safety host.

11. The system according to claim 8, wherein the PSD anti-pinch safety host is further configured to receive the signal sent by the interlocking module indicating that both the platform screen door and the train door are closed, and send the signal to the three-dimensional laser radar.

12. An anti-pinch method for a platform screen door and a train, comprising:
when both the platform screen door and a train door are in a closed state, a three-dimensional laser radar performing a three-dimensional scanning detection on an obstacle in an area between the platform screen door and the train in real time at an end of a platform by using an emitted laser scanning surface, and sending detection information of the obstacle to a PSD anti-pinch safety host;
the PSD anti-pinch safety host receiving the detection information of the obstacle sent by the three-dimensional laser radar, processing the detection information of the obstacle and sending a processing result to an alarm; and
the alarm receiving the processing result, and giving an alarm according to the processing result,
wherein the detection information of the obstacle comprises three-dimensional contour information of the obstacle, wherein after both the platform screen door and the train door are closed and before the three-dimensional laser radar performs the detection on the obstacle in the area between the platform screen door and the train, the method comprises:

determining an installation position of the three-dimensional laser radar to be installed at the end of the platform, according to a pulse intensity of a laser emitted by the three-dimensional laser radar, a length of the train, an angular resolution of the three-dimensional laser radar and a distance between the platform screen door and an outer wall of the train close to the platform screen door.

13. The method according to claim 12, wherein the distance between the platform screen door and the outer wall of the train close to the platform screen door is equal to a distance between a first intersection line and a second intersection line;

the first intersection line is an intersection line between the outer wall of the train close to the platform screen door and a first vertical laser scanning surface which is the only one vertical laser scanning surface among a plurality of vertical laser scanning surfaces perpendicular to a ground plane emitted by the three-dimensional laser radar that intersects with the outer wall of the train close to the platform screen door; and the second intersection line is an intersection line between the platform screen door and a second vertical laser scanning surface which is the only one vertical laser scanning surface among a plurality of vertical laser scanning surfaces perpendicular to the ground plane emitted by the three-dimensional laser radar that intersects with the platform screen door.

14. The method according to claim 12, wherein the three-dimensional laser radar performing the three-dimensional scanning detection on the obstacle further comprises emitting, by the three-dimensional laser radar, a plurality of laser scanning surfaces perpendicular to a ground plane, wherein one of the plurality of laser scanning surfaces perpendicular to the ground plane is parallel to a track of the train.

15. The method according to claim 12, wherein the three-dimensional contour information of the obstacle is information determined by performing scanning at angles with a preset interval along a direction perpendicular to the laser scanning surface by using the laser scanning surface emitted by the three-dimensional laser radar.

16. The method according to claim 12, wherein the PSD anti-pinch safety host is specifically configured to classify the obstacle according to shape information and displacement information of the obstacle to obtain a classification result of the obstacle, and send the classification result to the alarm;

the shape information of the obstacle is information determined according to the three-dimensional contour information in the detection information of the obstacle; and the displacement information of the obstacle is information determined according to distance information between the obstacle and the three-dimensional laser radar in the detection information of the obstacle.

17. The method according to claim 16, wherein the PSD anti-pinch safety host is specifically configured to:

determine that the classification result of the obstacle is a living creature if a change occurs in the shape information of the obstacle or the displacement information of the obstacle; and determine that the classification result of the obstacle is a non-living object if the shape information of the obstacle and the displacement information of the obstacle keep unchanged.

18. The method according to claim 12, further comprising:

sending, by an interlocking module, a signal indicating that both the platform screen door and the train door are closed to the PSD anti-pinch safety host, wherein:

the interlocking module is further configured to receive the processing result sent by the PSD anti-pinch safety host, so as to keep both the state of the platform screen door and the state of the train door in the closed state.

* * * * *